under the control of the United States Patent Office 3,341,550
GLYOXAL-BISCARBAMATE REACTION
PRODUCTS
Sidney L. Vail and Clifford M. Moran, New Orleans, La., assignors to the United States of America as represented by the Secretary of Agriculture
No Drawing. Original application Oct. 22, 1963, Ser. No. 318,129. Divided and this application Aug. 2, 1966, Ser. No. 574,890
3 Claims. (Cl. 260—309.7)

This application is a division of Serial No. 318,129, filed October 22, 1963.

A nonexclusive, irrevocable, royalty-free license in the invention herein described throughout the world for all purposes of the United States Government, with the power to grant sublicenses for such purposes, is hereby granted to the Government of the United States of America.

In copending application Serial No. 170,848, filed February 2, 1962, now Patent No. 3,111,522, of Sidney L. Vail, Clifford M. Moran, and Harry B. Moore, the formation and use of cyclic compounds formed from alkylenebis(carboxylic acid amides) and glyoxal were described. This present invention has as an object the formation and use of a new class of compounds and their ethers having the general structure:

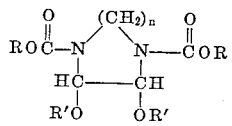

wherein $n$ is an integer of one or two, R is a member of the group consisting of an alkyl group of one to four carbon atoms, and R' is hydrogen or alkyl group of one to four carbon atoms. These compounds contain ester groups and hydroxyl groups or alkoxy groups which are useful in crosslinking or other reactions requiring polyfunctional reactants. In general, the compounds of the above structure should be useful as pesticides or in resin applications, textile finishing, pharmaceutical, and allied industries or as intermediates in these fields.

The five- and six-membered cyclic compounds of said Patent No. 3,111,522 were prepared in relatively concentrated aqueous solutions. The alkylenebis(carboxylic acid amides) were dissolved in a slightly alkaline, aqueous solution containing about 15 to 30% glyoxal. On standing, the desired product generally crystallized from the solution in a reasonable period of time.

In attempting this type of reaction with alkylenebiscarbamates it was noted that the biscarbamate failed to dissolve in the alkaline, aqueous 30% glyoxal solution. In the case where the biscarbamate was methylenebis(methyl carbamate) a pasty mass was formed which on standing became thicker. Solution of the mass in methanol, followed by fractional crystallization produced both the starting biscarbamate, methylenebis(methyl carbamate), and the desired compound, 1,3-dicarbomethoxy-4,5-dihydroxyimidazolidine (I). The product as isolated in this manner is contaminated by only a small amount of the unreacted biscarbamate. Higher purity, if desired, is realized by recrystallization from methanol.

The above reaction can be carried out in a methanol solution. Under these conditions the methanolic solution is allowed to stand for a short while and is then chilled to precipitate the starting biscarbamate, and the desired product.

The reaction proceeds readily at room temperature (20–25° C.) and temperatures of this order can be used. Excessive heating will cause the pH of the solution to decrease (presumably through the formation of glycolic acid). Extremely acidic or basic conditions should be avoided to minimize undesirable side reactions.

Ethers of the compounds of this invention can be formed by treating the compounds with a slightly acidic, alcoholic solution. For example, 1,3-dicarbomethoxy-4,5-dimethoxyimidazolidine (II) is prepared by heating the similar 4,5-dihydroxy compound (I) in an acidic methanolic solution. Compound II was found to be more resistant to heat than Compound I. Compound II on heating to 200° C. did not develop color, whereas Compound I developed color on melting at about 150° C.

Another object of this invention relates to the treatment of cellulosic textile materials to produce textiles having improved properties. In general, it has been shown that N-methylol groups of amide type compounds and their ethers are reactive with a variety of materials. Difunctional compounds of this type are known to readily form useful polymers and serve as effective crosslinking agents. Furthermore, the absence of NH groups in the compounds of this invention decreases the possibilities of chlorine retention and the subsequent disadvantages of yellowing or scorch damage to the fabric.

More specifically, the fabrics produced in this invention are resistant to wrinkling, have improved resiliency, and possess wash-wear properties. Moreover, the finishes produced from the new textile treating agents of this invention were found to be extremely resistant to acid hydrolysis.

These and other objects of the invention are accomplished by treating the cellulosic textile with an aqueous solution containing one of the compounds of this invention and an acidic catalyst. The concentration of the reactant can be varied depending on the particular textile processing conditions used, the type of textile being treated, and the properties desired in the finished textile. Generally, it is preferred to use from about 5% to 20% by weight of the reactant in the aqueous treating solution. Certain usages require even a lower percentage of the reactant. Also, blending of reactants, i.e., the use of more than one crosslinking reagent, can be employed to produce desirable finishes. The catalysts which can be used are well known in the trade. Magnesium chloride, zinc fluoborate, zinc nitrate, and a mixed catalyst composed of magnesium chloride and citric acid are examples of particularly suitable catalysts. From about 0.5% to about 5% by weight of the acidic catalyst is generally preferred.

Treatment of the cellulosic textile material is carried out by standard procedure. The textile is thoroughly wetted with the above-described treating solution, the excess liquid is mechanically removed, and the wetted textile is dried and cured. Following the curing operations, it is preferable but not absolutely necessary to water-wash the treated textile in an alkaline solution to remove any unreacted materials.

The processes of this invention can be used to treat substantially any hydrophilic fibrous cellulosic material such as cotton, rayon, ramie, jute, and the like which can be impregnated with a liquid, dried, and cured.

The following examples are given by way of illustration and not by way of limitation of the invention. The detailed procedures given below in the examples are illustrative, and are not the only or specific conditions for the production of an acceptable finished textile. Many variations or additions within these procedures can be made, as will be readily apparent to those skilled in the art. For example, a rapid cure at a relatively high temperature is generally equivalent to a slower cure at a lower temperature. Rapid cures are often used in industry.

In these examples all parts and percentages are by weight. The fabrics were tested by the following methods: Wrinkle recovery angle, Monsanto method, American Society for Testing Materials (ASTM) test D 1295–53T; breaking strength, ASTM test D39–49; damage caused by retained chlorine, American Association of Textile Chemists and Colorists tentative test method 92–1958T.

Example 1

To 48.6 grams of methylenebis(methyl carbamate) was added 58 grams of 30% glyoxal. After mixing the materials the pH was increased to 8 by the addition of 20% aqueous sodium hydroxide. The mixture (a paste) was allowed to stand at room temperature (20–25° C.) for four days. During this period the pH of the mixture was checked occasionally and readjusted, when necessary, to about 8 with dilute sodium hydroxide. The thickened mass was dissolved in warm methanol and then chilled to aid precipitation. Several fractions of methylenebis(methylcarbamate) prepicipitated before the desired product, 1,3-dicarbomethoxy-4,5-dihydroxyimidazolidine, precipitated. This product contained a small amount of methylenebis(methyl carbamate) which was essentially completely removed by recrystallization of the product from methanol. The white, recrystallized product melted at 149–151° C. with a slight coloring and was found to contain 38.21% carbon, 5.42% hydrogen, and 12.67% nitrogen. (Theory: 38.18% carbon, 5.49% hydrogen, and 12.72% nitrogen.)

The reaction was also carried out as follows: To 48.6 grams of methylenebis(methyl carbamate) was added 90.0 grams of 30% glyoxal which had been made slightly basic with 20% sodium hydroxide. This mixture was dissolved in 200 milliliters of methanol. The pH of the alcoholic solution was about 9. After standing at 20–25° C. for 20 hours the solution was chilled and worked up as before with similar results.

Example 2

To 3.5 grams of 1,3-dicarbomethoxy-4,5-dihydroxyimidazolidine prepared as described in Example 1 was added 40 milliliters of methanol which contained one drop of 6 N hydrochloric acid. The solution was refluxed for about six hours and then cooled. The desired product, 1,3-dicarbomethoxy-4,5-dimethoxyimidazolidine, prepicipitated and was isolated by filtration. The white crystals melted at 100–101° C. and the resultant liquid was not discolored when the temperature of the melting point determination apparatus was raised to 200° C. The material was found to contain 43.48% carbon, 6.48% hydrogen, and 11.29% nitrogen. (Theory: 43.55% carbon, 6.50% hydrogen, and 11.29% nitrogen.)

Example 3

1,3-dicarbomethoxy-4,5-dihydroxyimidazolidine, described in Example 1, was dissolved in water. To serve as catalyst, to one-half of the solution an acid was added, while to the other half a substance which produces acidity at elevated temperatures was added. A piece of cotton fabric was immersed in each of the fractions, and the excess liquid was removed mechanically. The wet fabrics were pinned to a frame, dried, and cured. The two sets of conditions are more fully described in the table below:

| Agent Concentration, percent | Catalyst | Catalyst Concentrations, percent | Drying Conditions | Curing Conditions |
|---|---|---|---|---|
| 10 | 60% Citric acid+40% MgCl$_2$.6H$_2$O. | 2 | 60° C./7 min | 160° C./1 min. |
| 10 | Zinc fluoborate | 2 | 60° C./7 min | 160° C./3 min. |

The crease recovery angles of the treated fabrics were increased from 29–39% over the untreated fabric. Further, these treated fabrics were not yellowed by strong hypochlorite bleaching solutions. Chlorine damage in the "scorch test" was negligible. On heating the treated fabric in a urea-phosphoric acid stripping solution (30 min. at 80° C.), under conditions which essentially completely remove common finishes such as those obtained from urea-formaldehyde, the crease recovery angle of the "stripped" fabric was not reduced and the nitrogen content of the fabric was reduced only 10%.

We claim:
1. A compound represented by the formula

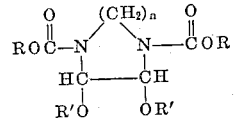

wherein $n$ is an integer less than three, R is an alkyl group of one to four carbon atoms, and R' is hydrogen or an alkyl group of one to four carbon atoms.
2. 1,3-dicarbomethoxy-4,5-dihydroxyimidazolidine.
3. 1,3-dicarbomethoxy-4,5-dimethoxyimidazolidine.

References Cited

UNITED STATES PATENTS

| | | | |
|---|---|---|---|
| 2,717,896 | 9/1955 | Goldman | 260—268 |
| 2,777,857 | 1/1957 | König | 260—309.7 |
| 3,029,164 | 4/1962 | Seki et al. | 260—309.7 |
| 3,111,522 | 11/1963 | Vail et al. | 260—309.7 |
| 3,112,156 | 11/1963 | Vail et al. | 260—309.7 |

FOREIGN PATENTS 783,051  9/1957  Great Britain.

WALTER A. MODANCE, *Primary Examiner.*

N. TROUSOF, *Assistant Examiner.*